March 10, 1925. 1,529,513
F. SWAN
FISHING TOOL FOR WELLS
Filed April 8, 1924  3 Sheets-Sheet 1
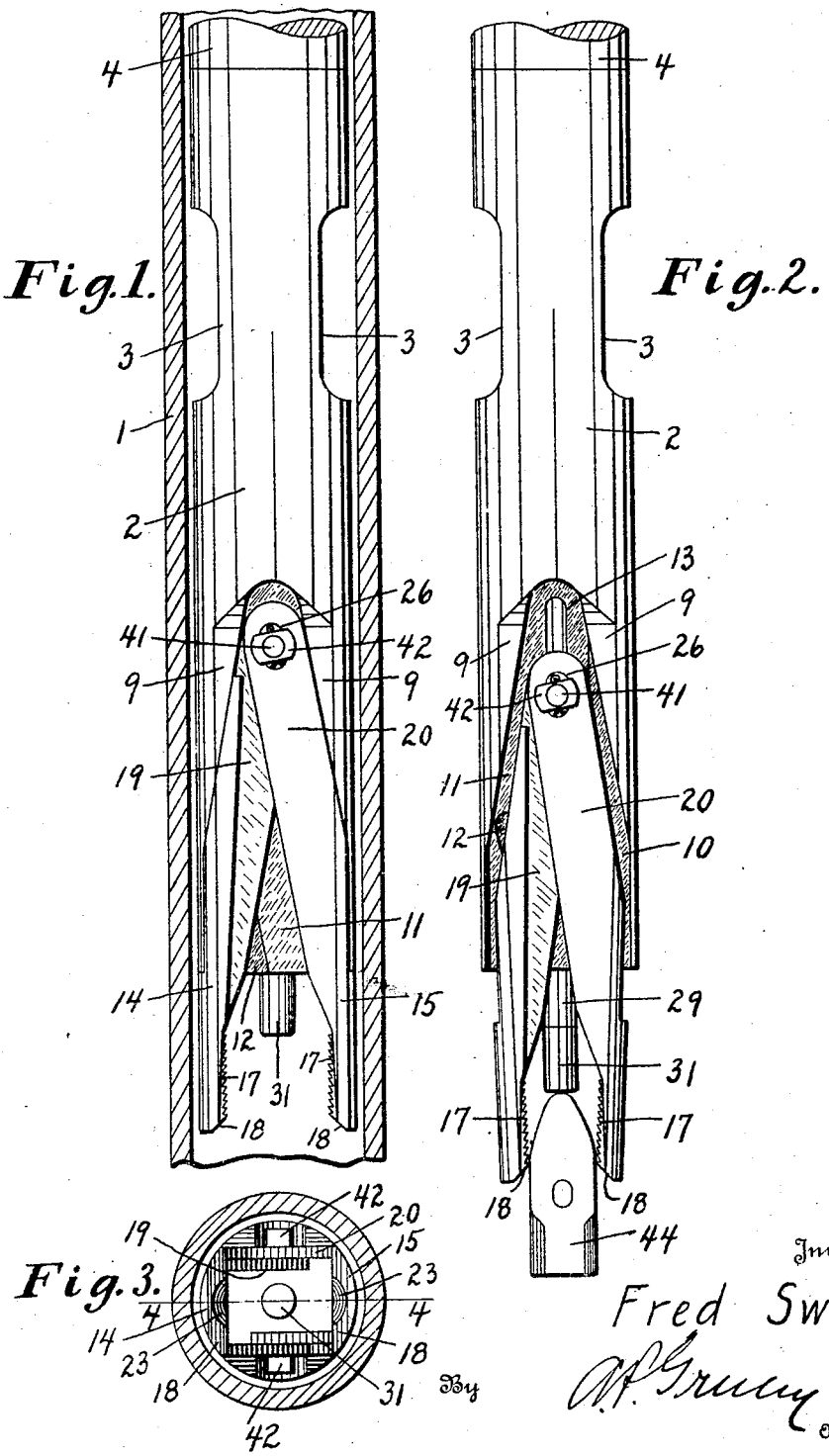
Inventor
Fred Swan.

March 10, 1925. 1,529,513

F. SWAN

FISHING TOOL FOR WELLS

Filed April 8, 1924 3 Sheets-Sheet 2

Inventor
Fred Swan.
By *[signature]*
Attorney

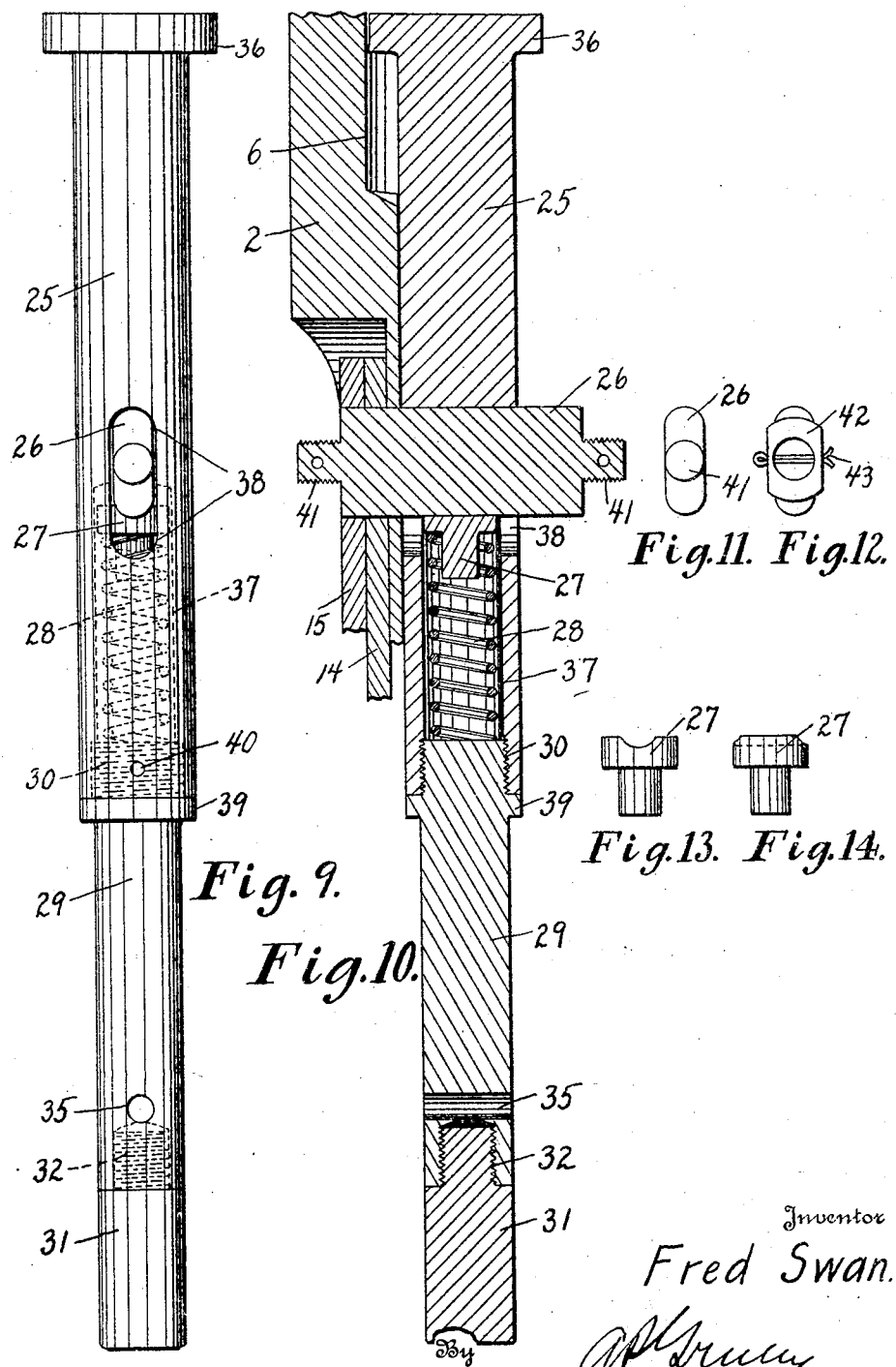

Patented Mar. 10, 1925.

1,529,513

UNITED STATES PATENT OFFICE.

FRED SWAN, OF MARIETTA, OHIO.

FISHING TOOL FOR WELLS.

Application filed April 8, 1924. Serial No. 705,079.

*To all whom it may concern:*

Be it known that I, FRED SWAN, residing at Marietta, in the county of Washington and State of Ohio, and a citizen of the United States, have invented certain new and useful Improvements in Fishing Tools for Wells, of which the following is a specification, reference being had to the accompanying drawings, forming a part thereof.

The invention relates to fishing tools for wells and is designed particularly for grasping or grabbing and removing from bored or drilled wells fragments of drilling tools and other objects which may become lodged in the well hole.

One object of the invention is to provide a fishing tool or grab which cannot be spread or jammed in the well hole.

Another object is to provide a fishing tool which will grasp an object positively and powerfully.

A further object is to provide a tool which will center an object grasped so that there is little likelihood of the object becoming caught as it is drawn up through the well casing.

A further object is to provide a tool of strong and reliable construction which may be operated successfully without requiring exceptional skill.

With these objects and other objects hereinafter set forth in view, the invention consists in the construction and combination of elements hereinafter described and claimed.

Referring to the drawings:

Figure 1 is an elevation of the fishing tool showing its grasping jaws set, the well casing being shown in section;

Figure 2 is an elevation of the fishing tool showing its grasping jaws sprung and holding a sledge head;

Figure 3 is an end view of Figure 1;

Figure 9 is an enlarged elevation of the operating mechanism for the grasping jaws;

Figure 10 is a central vertical sectional view of the construction shown in Figure 9;

Figure 11 is an end view of the cross pin;

Figure 12 is an end view of the cross pin with a nut and cotter pin in place;

Figure 13 is a detail front elevation of a spring thrust bearing; and

Figure 14 is a side elevation of the same.

Figure 4:
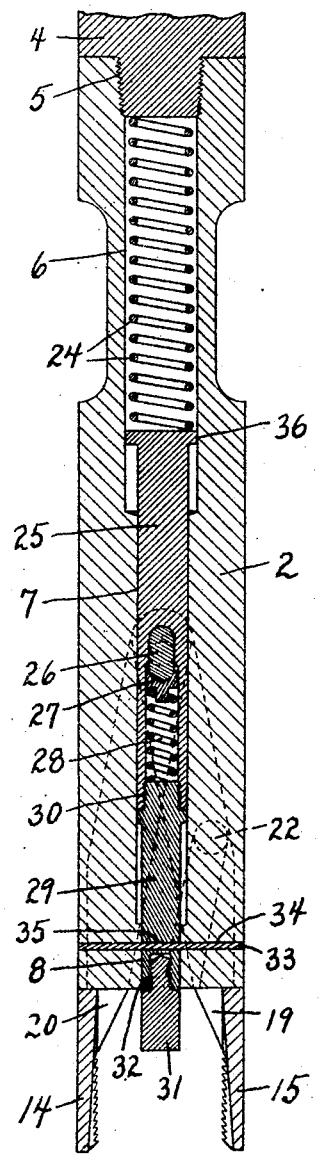
Figure 4 is a vertical central sectional view of the fishing tool on the line 4—4 of Figure 3.
Figure 5:
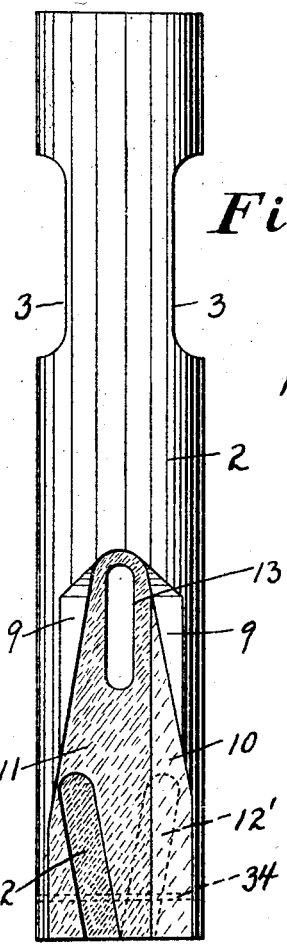
Figure 5 is an elevation of the body of the fishing tool.

In the drawings, 1 indicates the well casing, 2 indicates the body of the fishing tool cut away at 3 to provide a hold for a wrench used to assemble and take down the tool, and 4 indicates the upper portion of the tool which is connected to the body 2 by the screw joint 5. The upper portion 4 of the tool is arranged in any suitable manner for coupling up with the string of drilling tools.

The body 2 of the fishing tool is centrally bored throughout its lengths so as to form three cylindrical chambers 6, 7 and 8 of different diameters, chambers 6 being the largest in diameter and chamber 8 the smallest. The lower part of the body 2 is cut away to a slight depth so as to leave the flat surfaces 9 and 9', a second deeper cut is made on both sides so as to form recesses having the flat surfaces 10 and 10', a third deeper cut is made on both sides so as to form recesses having the flat surfaces 11 and 11', and a final still deeper cut is made on both sides to form the inclined channels 12 and 12'. The slot 13 is then cut through the tool body 2. The purpose of cutting away the tool body 2 so as to form the flat surfaces 10, 10' and 11, 11' is to provide suitable bearing surfaces for the grasping jaw pieces.

Figure 7:
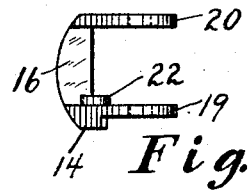
Figure 7 is a top plan view of one of the grasping jaws.
Figure 8:
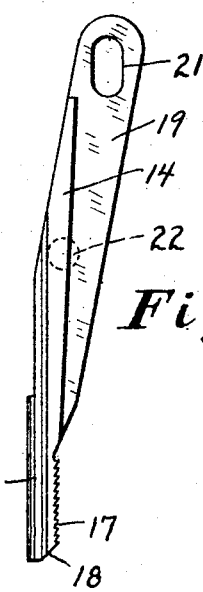
Figure 8 is an elevation of the same.
Figure 6:
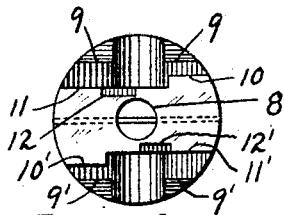
Figure 6 is a bottom end view of the same.

The grasping jaw pieces 14 and 15 are alike and are shown in detail in Figures 7 and 8. The heavy or base portion 16 of each jaw piece carries teeth 17 and is preferably cut away at 18. From the base portion 16 extend upward two parallel arms 19 and 20 which are slotted near their upper ends at 21. The arm 19 has secured to its inside the stud 22 which is adapted to slide in the inclined channel 12 of the tool body 2. As shown in Figure 3, the mid portions of the grasping teeth 17 may be cut out as shown at 23 so that the grasping jaws may have a tendency to center an object grasped.

The operating mechanism for the grasping jaws comprises a main spiral spring 24, a main plunger 25, a cross pin 26, a yielding bearing 27, a small spiral spring 28, a second plunger portion 29 connected to the plunger 25 at the screw joint 30, and a plunger tip 31 connected to the plunger portion 29 at the screw joint 32. A small hole 34 is drilled diametrically through the body 2 of the fishing tool and a similar hole is drilled through the plunger portion 29. When the grasping jaws of the fishing tool are placed in the set position, a thin cast iron pin 33 is passed through the hole 34, 35 and holds the grasping jaws in set position.

Details of the operating mechanism for the grasping jaws are shown in enlarged views in Figures 9, 10, 11, 12, 13 and 14. The main plunger 25 is of suitable diameter to permit it to slide freely in the chamber 7 of the tool body 2, except that a shoulder 36 is formed at the upper end to slide within the chamber 6 of the tool body to limit the downward movement of the plunger. In the lower end of the main plunger 25 is formed a central chamber 37 to afford space for the spring 28 and the yielding bearing 27, and at the lower end of this chamber screw threads are provided for the screw joint 30. A slot 38 somewhat longer than the vertical dimension of the cross pin 26 extends through the plunger 25.

The plunger portion 29 has at its upper end a shoulder 39 and screw threads for the joint 30. A small hole 40 may be drilled through the plunger 25, 29 at the screw joint 30 to provide for a locking pin or rivet. The hole 35 is provided in plunger 29 for the cast iron pin 33 and the plunger tip 31 is connected to the plunger portion 29 by the screw joint 32. The plunger portion 29 is of a diameter to fit and slide in the chamber 8 of the tool body.

The cross pin 26 is losenge shaped in cross section so as to provide adequate strength with a width to fit the slots 38 and 13 of the plunger 25 and the tool body 2. The arms 19 and 20 of the grasping jaws 14 and 15 are provided with the slots 21 adapted to fit over the ends of the cross pin 26 as indicated in Figure 10. Screw threaded pins 41 are formed on both ends of the cross pin 26 and are each provided with a hole to receive a cotter pin. Nuts 42 preferably of the shape shown in Figure 12 are used to hold the cross pin 26 and the arms of the grasping jaws 14 and 15 together. Cotter pins 43 are used to lock the nuts 42.

As assembled and with the grasping jaws in set position, the fishing tool is shown in Figure 1 and sectionally in Figure 4. The plunger 25, 29, 31 is shown pushed up against the pressure of the main spiral spring 24 and held up by the thin cast iron pin 33. The cross pin 26 is thus pushed well up to the upper end of slot 38 and the grasping jaws are raised and spread by the studs 22 which are at the upper ends of the inclined channels 12 and 12′ in which they slide.

When the fishing tool is placed in the well casing and dropped down onto an object to be lifted, the plunger tip 31 strikes the object with force sufficient to cause it to be driven upward to break the cast iron pin 33. The spring 28 inside the plunger is arranged to permit the plunger to move upward sufficiently to break the pin 33 without causing the cross pin 26 to move. As already noted the cross pin 26 is at the upper end of slot 38 when the grasping jaws are set, and as it cannot move further upward, the movement necessary to break pin 33 is permitted by the yielding bearing 27.

When the cast iron pin 33 is broken, the spring 24 forces the plunger and cross pin 26 downward, thereby forcing the grasping jaw pieces 14 and 15 downward, and, by the action of the inclined channels 12 and 12′ on the studs 22, causing the grasping jaws to be swung inward, the jaws swinging on the pin 26, the holes 21 in the upper ends of the jaw pieces being large enough to permit this movement. The position of the grasping jaws when an object is gripped is shown in Figure 2, the object here being the sledge head 44.

The fishing tool as thus described may be raised and lowered in the well repeatedly without causing the jaws to be released from their set position until the object fished for is central between the jaws in position to be struck by the plunger tip 31. Even when the tool is lowered below the casing, the jaws cannot be spread beyond the diameter of the tool body because of the engagement of the pins 22 in the channels 12 and 12′, undue spreading being also prevented by contact of the outer edges of the arms 19 and 20 with the edges of the recesses in which they are received. Thus the jaws cannot be so spread as to offer any resistance to the entry of the tool into the lower end of the casing in drawing out.

While the construction described and shown having both jaws movable is preferred, one of the jaws may, if desired, be fixed or formed integral with the tool body.

It should be noted that the tool made as described may be used without being set and without the use of the frangible pin 33. When so used, the fishing tool will have its grasping jaws forced downward and inward by spring 24 and reliance will be placed upon the weight of the string of tools to force upward and expand the jaws when they come in contact with an object in the well. As the jaws expand, they will slip down the sides of the object, and, as the body of the tool is raised, the jaws will be forced downward and inward relative to the tool body by the spring 24 to grasp the object. If the fishing tool is to be used without frangible pin 33, plunger parts 31, 29, 28 and 27 may be omitted.

Having thus described my invention, what I claim is:

1. In a fishing tool, a tool body, grasping jaws carried by the tool body and extending downward from its lower end, one of said grasping jaws being vertically movable relative to the tool body, a frangible pin for holding said grasping jaw in raised position, means arranged between the grasping jaws in position to strike the article to be grasped for breaking said pin to release the jaw, means for forcing the jaw downward and means for causing it to move towards the opposite jaw as it is forced downward.

2. In a fishing tool, a tool body, a pivot pin carried by the tool body and vertically movable therein, a grasping jaw carried by the tool body pivoted at its upper end on said pivot pin and extending downward from the lower end of the tool body, an opposing jaw extending downward from the lower end of the tool body, means for holding said grasping jaw in raised position, means for releasing it, means independent of the pivot pin for forcing it downward and means for causing it to move towards the opposite jaw as it is forced downward.

3. In a fishing tool, a tool body, a pivot pin carried by the tool body and vertically movable therein, grasping jaws carried by the tool body and extending downward from its lower end, one of said grasping jaws being pivotally mounted on said pivot pin and vertically movable therewith, means for holding said grasping jaw in raised position, means for releasing it, means for forcing it downward and means for causing it to move towards the opposite jaw as it is forced downward comprising a pin carried by the jaw independent of the pivot pin and an inclined channel formed in the tool body.

4. In a fishing tool, a tool body, a pair of grasping jaws carried by the tool body and vertically movable relative thereto and having their lower ends extending below the lower end of the tool body, frangible means for holding said jaws in raised position, means for breaking said frangible holding means comprising a vertically movable member arranged between the jaws in position to strike the article to be grasped, means for forcing the jaws downward, and means for causing the lower ends of the jaws to move towards each other as they are forced downward.

5. In a fishing tool, a tool body, a pair of grasping jaws carried by the tool body and vertically movable relative thereto, and having their lower ends extending below the lower end of the tool body, frangible means for holding said jaws in raised position, means adapted to strike and be operated by the article to be grasped for breaking said frangible holding means, means for forcing the jaws downward, and means for causing the lower ends of the jaws to move towards each other as they are forced downward.

6. In a fishing tool, a tool body, a pair of grasping jaws carried by the tool body and vertically movable relative thereto and having their lower ends extending below the lower end of the tool body, frangible means for holding said jaws in raised position, means comprising a pin extending downward below the lower end of the tool body between the jaws adapted to strike and be operated by the article to be grasped for breaking said frangible holding means, means for forcing the jaws downward, and means for causing the lower ends of the jaws to move towards each other as they are forced downward.

7. In a fishing tool, a tool body, a pivot pin carried by and vertically movable in the tool body, grasping jaws pivoted at their upper ends on said pivot pin and having their lower ends extending downward below the lower end of the tool body, means for holding the pivot pin and jaws in raised position, means for releasing the pivot pin and jaws comprising a pin extending downward below the lower end of the tool body between the grasping jaws, means for forcing the pivot pin and jaws downward consisting of a spring carried by the tool body, and means for causing the lower ends of the jaws to swing towards each other as they are forced downward.

8. In a fishing tool, a tool body, a pivot pin carried by and vertically movable in the tool body, grasping jaws pivoted at their upper ends on said pivot pin and having their lower ends extending downward below the lower end of the tool body, means for holding the pivot pin and jaws in raised position, means for releasing the pivot pin and jaws comprising a pin extending downward below the lower end of the tool body between the grasping jaws, means for forcing the pivot pin and jaws downward consisting of a spring carried by the tool body, and means for causing the lower ends of the jaws to swing towards each other as they are forced downward comprising obliquely arranged channels in the tool body and pins carried by the jaws and extending into said channels.

9. In a fishing tool, a tool body centrally bored, a plunger carried in said bore and movable therein longitudinally of the tool body, a pivot pin carried by the plunger extending outward through and movable in slots formed in the tool body, grasping jaws having their lower ends extending below the lower end of the tool body and one of said grasping jaws being pivoted at its upper end on said pivot pin, a spring within the tool body adapted to force the plunger downward, means for causing the lower end of the jaw to swing inward towards the opposite jaw as it is forced downward by the spring, means for restricting the outward swing of the jaw, means for holding the plunger in raised position against the force of said spring, and means for causing the retaining means to release the plunger and permit it to be moved downward by the spring.

10. In a fishing tool, a tool body centrally bored, a plunger carried in said bore and movable therein longitudinally of the tool body, a pivot pin carried by the plunger extending outward through and movable in slots formed in the tool body, grasping jaws having their lower ends extending below the lower end of the tool body and pivoted at their upper ends on said pivot pin, a spring within the tool body adapted to force the plunger downward, means for causing the lower ends of the jaws to swing inward towards each other as they are forced downward by the spring, means for restricting the outward swing of the jaws, means for retaining the plunger in raised position against the force of said spring, and means for causing the retaining means to release the plunger and permit it to be moved downward by the spring.

11. In a fishing tool, a tool body centrally bored, a plunger carried in said bore and movable therein longitudinally of the tool body, a pivot pin carried by the plunger extending outward through and movable in slots formed in the tool body, grasping jaws having their lower ends extending below the lower end of the tool body and one of said grasping jaws being pivoted at its upper end on said pivot pin, a spring within the tool body adapted to force the plunger downward, means comprising an oblique channel formed in the tool body and a pin carried by the jaw and movable in said channel for causing the lower end of the jaw to swing inward towards the opposite jaw as it is forced downward by the spring, means for restricting the outward swing of the jaw, means for retaining the plunger in raised position against the force of said spring, and means for causing the retaining means to release the plunger and permit it to be moved downward by the spring.

12. In a fishing tool, a tool body centrally bored, a plunger carried in said bore and movable therein longitudinally of the tool body, a pivot pin carried by the plunger extending outward through and movable in slots formed in the tool body, grasping jaws having their lower ends extending below the lower end of the tool body and pivoted at their upper ends on said pivot pin, a spring within the tool body adapted to force the plunger downward, means comprising oblique channels formed in the tool body and pins carried by the jaws and movable in said channels for causing the lower ends of the jaws to swing inwards towards each other as they are forced downward by the spring, means for restricting the outward swing of the jaws, means for retaining the plunger in raised position against the force of said spring, and means comprising a pin carried by the plunger extending downward below the lower end of the tool body between the grasping jaws for causing the retaining means to release the plunger and permit it to be moved downward by the spring.

13. In a fishing tool, a tool body centrally bored, a plunger carried by the tool body in said bore and movable therein longitudinally of the tool body, a pivot pin carried by the plunger extending outward through and movable in slots formed in the tool body, a yielding bearing for said pivot pin adapted to permit the plunger to move upward relative to said pivot pin, grasping jaws having their lower ends extending below the lower end of the tool body and one of said grasping jaws being pivoted at its upper end on said pivot pin, a spring within the tool body adapted to force the plunger downward, means for causing the lower end of the jaw to move inward toward the opposite jaw as it is forced downward by the spring, means for restricting the outward swing of the jaw, means comprising a frangible pin for retaining the plunger in raised position against the force of said spring, and means comprising a pin carried by the plunger extending downward below the lower end of the tool body between the grasping jaws adapted to cause the plunger to move upward relative to the pivot pin to cause the frangible pin to be broken to release the plunger and permit it to be moved downward by the spring.

14. In a fishing tool, a tool body centrally bored, a plunger carried in the bore and movable therein longitudinally of the tool body, a pivot pin carried by the plunger extending outward through and movable in a slot formed in the tool body, a yielding bearing for said pivot pin carried by the plunger adapted to permit the plunger to move upward relative to the pivot pin, grasping jaws having their lower ends extending below the lower end of the tool body and being pivoted at their upper ends on said pivot pin, a spring within the tool body adapted to force the plunger downward, means for causing the lower ends of the jaws to swing inwards toward each other as they are forced downward by the spring, means for restricting the outward swing of the jaws, means for retaining the plunger in raised position against the force of said spring, and means for causing the plunger to move upward relative to the pivot pin to release the retaining means and permit the plunger to be moved downward by the spring.

15. In a fishing tool, a tool body centrally bored, a plunger carried in the bore and movable therein longitudinally of the tool body, a pivot pin carried by the plunger extending outward through and movable in a slot formed in the tool body, a yielding bearing for said pivot pin carried by the plunger adapted to permit the plunger to move upward relative to the pivot pin, grasping jaws having their lower ends extending below the lower end of the tool body and one of said jaws being pivoted at its upper end on said pivot pin, a spring within the tool body adapted to force the plunger downward, means comprising an oblique channel formed in the tool body and a pin carried by the jaw and movable in said chanel for causing the lower end of the jaw to swing inward towards the opposite jaw as it is forced downward by the spring, means for restricting the outward swing of the jaw, means for retaining the plunger in raised position against the force of said spring, and means for causing the plunger to move upward relative to the pivot pin to release the plunger and permit it to be moved downward by the spring.

16. In a fishing tool, a tool body centrally bored, a plunger carried in the bore and movable therein longitudinally of the tool body, a pivot pin carried by the plunger extending outward through and movable in a slot formed in the tool body, a yielding bearing for said pivot pin carried by the plunger adapted to permit the plunger to move upward relative to the pivot pin, grasping jaws having their lower ends extending below the lower end of the tool body pivoted at their upper ends on said pivot pin, a spring within the tool body adapted to force the plunger downward, means comprising oblique channels formed in the tool body and pins carried by the jaws and movable in said channels for causing the lower ends of the jaws to swing inward towards each other as they are forced downward by the spring, means for restricting the outward swing of the jaws, means for retaining the plunger in raised position against the force of said spring, and means for causing the plunger to move upward relative to the pivot pin to release the plunger and permit it to be moved downward by the spring.

17. In a fishing tool, a tool body centrally bored, a plunger carried in the bore and movable therein longitudinally of the tool body, a pivot pin carried by the plunger extending outward through and movable in a slot formed in the tool body, a yielding bearing for said pivot pin carried by the plunger adapted to permit the plunger to move upward relative to the pivot pin, grasping jaws having their lower ends extending below the lower end of the tool body one of said jaws being pivoted at its upper end on said pivot pin, a spring within the tool body adapted to force the plunger downward, means comprising an oblique channel formed in the tool body and a pin carried by the jaw and movable in said channel for causing the lower end of the jaw to swing inward towards the opposite jaw as it is forced downward by the spring, means for restricting the outward swing of the jaw, means comprising a frangible pin for retaining the plunger in raised position against the force of said spring, and means comprising a pin carried by the plunger extending downward below the lower end of the tool body between the grasping jaws adapted to cause the plunger to move upward relative to the pivot pin to cause the frangible pin to be broken to release the plunger and permit it to be moved downward by the spring.

18. In a fishing tool, a tool body centrally bored, a plunger carried in the bore and movable therein longitudinally of the tool body, a pivot pin carried by the plunger extending outward through and movable in a slot formed in the tool body, a yielding bearing for said pivot pin carried by the plunger adapted to permit the plunger to move upward relative to the pivot pin, grasping jaws having their lower ends extending below the lower end of the tool body pivoted at their upper ends on said pivot pin, a spring within the tool body adapted to force the plunger downward, means comprising oblique channels formed in the tool body and pins carried by the jaws and movable in said channels for causing the lower ends of the jaws to swing inward towards each other as they are forced downward by the spring, means for restricting the outward swing of the jaws, means comprising a frangible pin for retaining the plunger in raised position against the force of said spring, and means comprising a pin carried by the plunger extending downward below the lower end of the tool body between the grasping jaws adapted to cause the plunger to move upward relative to the pivot pin to cause the frangible pin to be broken to release the plunger and permit it to be moved downward by the spring.

19. In a fishing tool, a tool body, a pivot pin carried by the tool body and vertically movable therein, grasping jaws carried by the tool body and extending downward from its lower end, one of said grasping jaws being pivotally mounted on said pivot pin and vertically movable therewith, means for forcing the movable grasping jaw downward and means for causing it to move towards the opposite jaw as it is forced downward comprising a pin carried by the jaw independent of the pivot pin and an inclined channel formed in the tool body.

20. In a fishing tool, a tool body, a pivot pin carried by the tool body and vertically movable therein, grasping jaws pivoted, at their upper ends on said pivot pin and having their lower ends extending downward below the lower end of the tool body, means for forcing the pivot pin and jaws downward, and means for causing the jaws to move inward toward each other as they are forced downward comprising a pin carried by each jaw independent of the pivot pin and inclined channels formed in the tool body.

In testimony whereof I hereunto affix my signature.

FRED SWAN.